(12) United States Patent
Kraft et al.

(10) Patent No.: US 6,392,739 B1
(45) Date of Patent: May 21, 2002

(54) METHOD FOR OPTIMIZING A COPYING LIGHT PROFILE

(75) Inventors: Walter Kraft, Zürich; Max Nussbaumer, Bellikon, both of (CH)

(73) Assignee: Gretag Imaging Trading AG (CH)

( * ) Notice: Subject to any disclaimer, the term of this patent is extended or adjusted under 35 U.S.C. 154(b) by 0 days.

(21) Appl. No.: 09/493,609

(22) Filed: Jan. 28, 2000

(30) Foreign Application Priority Data

Jan. 29, 1999 (EP) .............................................. 99101595
Jan. 18, 2000 (EP) .............................................. 00100242

(51) Int. Cl.$^7$ ......................... G03B 27/52; G03B 27/80
(52) U.S. Cl. ............................ 355/41; 355/38; 355/40
(58) Field of Search ....................... 355/32, 35, 38–41, 355/67, 77, 68

(56) References Cited

U.S. PATENT DOCUMENTS

| | | | | |
|---|---|---|---|---|
| 4,812,879 A | * | 3/1989 | Suzuki | 355/38 |
| 4,918,483 A | * | 4/1990 | Otake | 355/40 |
| 5,119,125 A | | 6/1992 | Kraft | 355/38 |
| 5,365,353 A | | 11/1994 | Kraft | 358/518 |
| 5,424,802 A | * | 6/1995 | Saita | 355/43 |
| 5,729,329 A | * | 3/1998 | Ajimu et al. | 355/40 |
| 5,805,274 A | * | 9/1998 | Saita | 355/38 |

FOREIGN PATENT DOCUMENTS

| | | |
|---|---|---|
| DE | 4040498 A1 | 6/1992 |
| DE | 19703063 A1 | 8/1998 |

OTHER PUBLICATIONS

R.W.G. Hunt: "The Reproduction of Colour", 1995, Fountain Press, England XP002109511 pp. 100–103; 319–360; 628–631; 672–702.

* cited by examiner

*Primary Examiner*—Russell Adams
*Assistant Examiner*—Henry Hung Nguyen
(74) *Attorney, Agent, or Firm*—Burns, Doane, Swecker & Mathis, LLP

(57) ABSTRACT

The present invention relates to a system for the optimization of a copying light profile during copying of photographic originals in a photographic copier. The photographic copier comprises a light source for producing copying light, a number of light conducting means for guiding the copying light along a light path, and a local transmission modulator. An element with a known transmission profile is provided in the light path for being shone through, whereby no photographic original to be copied and of unknown transmission profile is found in the light path, and furthermore a transmission profile specific for the local transmission modulator is provided. The resulting copying light is measured broken down by area, and the profile of the copying light is measured and compared with a desired copying light profile. Based on this comparison, the transmission profile preselected for the copying process is optimized.

16 Claims, 3 Drawing Sheets

METHOD FOR OPTIMIZING A COPYING LIGHT PROFILE

This application claims priority under 35 U.S.C. §§119 and/or 365 to European Patent Application No. 99 101 595.9 filed in Europe on Jan. 29, 1999 and European Patent Application No. 00 100 242.7 filed in Europe on Jan. 18, 2000; the entire content of which is hereby incorporated by reference.

FIELD OF THE INVENTION

The present invention relates to a method for the optimization of a copying light profile of a photographic copier. The present application especially relates to the optimization of a copying light profile in a copier, which includes a local transmission modulator, for example a liquid crystal matrix. The invention further relates to the use of such a local transmission modulator in a photographic copier for the achievement of optimization.

BACKGROUND ART

Copier apparatuses for the copying of photographic originals, especially transparent originals, for example films (positive films, negative films), are known, for example, from DE 4308864, DE 4040498, or DE 19703063. The copier apparatuses described therein use an LC matrix (liquid crystal matrix) in order to influence the copying light used for the exposure process. The LC matrix serves the brightening or darkening of certain regions of the copy in order to so manipulate the copy of a photographic original in a desired manner. The mask used therefor according to which an LC matrix is controlled is derived from the photographic original and is therefore dependent on its respective image data.

Optical components such as a high-value illumination means and optical, light guide means, for example, mirrors, elliptical mirrors, lenses, stops, filters, light mixers, shutters and so on are used in a copier apparatus in order to achieve as smooth a profile as possible of the copying light (which means the copying light intensity or the copying light density) which is as free from variations as possible in order to thereby illuminate the original as optimally as possible.

However, in practice, the copying light profile achieved is not optimal. This can be caused, for example, by a less than optimal cooperation of the light conducting means or by undesired modifications of the copying light by the light conducting means. For example, annular structures can occur.

SUMMARY OF THE INVENTION

The inventors of the present application have realized that a local transmission modulator, for example an LC matrix or a controllable scatter matrix, can be used during a respective copier process not only for the manipulation of a copy in dependence of a given original, but also for the general improvement of the copying properties of a specific copier, and independent from the original to be respectively copied.

It is an object of the invention to provide a method and apparatus by which the copying light profile in a copy apparatus can be optimized. Furthermore, in accordance with the invention a local transmission modulator is used for this optimization.

Advantageously, a cost-effective optimization of the copying light profile is possible by using a local transmission modulator already present in a copier apparatus. The costly optimization process for then calibration of the optical components can then be simplified. It is further made possible to use cheaper optical components with larger manufacturing tolerances, since inhomogentities caused thereby can be equalized with the method in accordance with invention.

The method in accordance with invention is used in a photographic copier as described, for example, in European application number 99101595.9 and corresponding application s in USA, Japan, Canada and China, the disclosure of which is here by incorporated into the application. Such a copier apparatus uses at least one light source, for example a halogen lamp or LED diodes to produce the copying light. The produced copying light is guided in the copier apparatus through a number of optical, light conducting means, for example, shutters, lenses, mirrors, partially transparent mirrors, beam splatters, lenses, diffuses, prisms, and so on, along a beam path (optical axis) through the photographic original to the copier material. The light is preferably homogenized by homogenizing means, for example scatter disks, before it reaches the photographic original. The photographic original is transparent and can be, for example, a negative film or a positive film. The copier material is, for example, a photographic paper. The photographic original is shone through and the shone through original image is projected onto the copier material.

The copying light profile is then considered optimal when it takes on a desired form. Preferably, the copying light profile is formed in such a way (in the plane of the copy) that the copy of a photographic original results in a homogeneous copy (for example, homogeneously gray) when the photographic original is based on the photographic recording (for example by way of a camera) of a homogeneous (for example, homogeneously gray) image. If the photographic recording were perfect, the photographic original would then also be homogeneous and one would therefore desire a homogeneous copying light profile. However, the recording lenses of cameras cause a decrease of the exposure light strength from the center to the edge. Therefore, a copying light profile is then preferably considered optimal, when it at least partly equalizes this decrease and not only attenuates disruptions of the copying light caused by the light conducting means. A homogeneous picture recorded by a camera is thereby duplicated by an at least approximately homogeneous copy.

A local transmission modulator is preferably positioned in a photographic copier apparatus in the vicinity of the original and either therebefore or thereafter. The copying light is passed through the local transmission modulator. The local transmission modulator can change its transmission whereby it is preferably electrically controlled therefor. The change of the transmission preferably takes place spacially broken down (locally), which means different transmissions can be adjusted at different locations (elements of the transmission modulator). As already described in connection with the prior art, a specific transmission profile is adjusted at the transmission modulator in order to manipulate the brightness profile of the copy depending on the image data of the original for the copying of a photographic original. This transmission profile is in the following referred to as transmission profile preselected for the copying process. If no manipulation of the copy is planned, an even transmission profile is preselected according to the prior art. This was then the case in the prior art, for example, when the photographic original was a homogeneous picture.

According to the process in accordance with invention, the transmission profile of the local transmission modulator preselected for the copy process is changed in dependence of a given (actual) and a desired (nominal) copying light profile. The copying light profile can be described, for example, as the profile of a copying light intensity or an optical density of the copying light or the illumination intensity of the copying light or as the function of these variables. The transmission profile during the copying of an original which is supposed to represent a homogeneous picture is changed in such a way that inhomogeneities in the copy are removed or at least attenuated.

To change a transmission profile in such a way that the copying light profile is optimized, several steps are required. First, the given copying light profile in a copier apparatus must be measured. This copying light profile is dependent of the optical components used (light source; light conducting means; light scattering means, such as LC matrix, scatter disks; means light absorbing means, such as filters or also LC matrix) and depending on the type of the copier apparatus can even vary from copier to copier of the same type. The copying light profile broken down per area describes the strength of the copying light transverse to the light path in the copy plane (for example, expressed as intensity or optical density). In order to measure this, essentially two steps are required. A defined measuring environment for the measuring of the copying light profile is created in a first step. For this purpose a transparent element with a known transmission profile is preferably entered into the light path instead of any arbitrary photographic original. This can be, for example, a test filter, the spectral transparency of which is adapted to the spectrum of an average original. Preferably, the transparent element is positioned between original and copy plane, especially preferably in the vicinity of the projection lens, for example, in the stop plane of the projection lens or directly under the projection lens. Also possible is a placement of the transparent element at the location where during the normal copier operations (but not during the measuring of the copying light profile), the photographic original is located, or in the vicinity of that location. The transparent element can be a photographic original exposed in an appropriate manner which has especially a smooth or homogeneous transmission profile. It can also be a photographic original which was produced by the photographic recording of a homogeneously gray image and has the typical edge decline of the transmission as occurs in pictures made with a typical camera. In this case, the desired nominal profile in the copy plane is then homogeneous. The desired copying light profile (nominal profile) is preferably independent of the image content of the photographic originals to be copied.

The transparent element can also be, for example, a gray filter. Alternatively, no transparent element or a completely transparent element can be provided in the light path. In this alternative case, only a short measurement period is used for the measurement of the copying light profile.

Before the optimization process, a transmission profile specific for the local transmission modulator is preferably provided for the further assessment of the measurement environment. The transmission characteristics which depend on the control variables (control voltages) are known for each transmission element of the local transmission modulator. The transmission profile specific for the measurement is preferably smooth or homogeneous.

If, as described above, a defined measurement environment is created for the measurement of the copying light profile, whereby, contrary to the copying process, no photographic original (of unknown transmission) is located in the light path of the copier apparatus, the copier light is measured in a subsequent step for the determination of the copying light profile. This measurement preferably takes place after the copying light has passed the transparent element or after the last optical components (for example, the last light conducting means). Especially preferred is the measurement of the copying light profile in the copy plane or in the vicinity of the copy plane. For example, a conventional copier material (photographic paper) can be fastened in the copy plane and the exposed copier material then examined for brightness variations, whereby the grading of the copier material must be considered. The exposed copier material can therefor be scanned, for example, by a scanner or densitometer with preferably calibrated gray scale, in order to thereby digitalize the copying light profile measured with the copier material (photographic paper). Alternatively, other light detection means broken down by area, for example, a diode array for the measuring of the copying light profile can be used. Such a detector for the measurement of the copying light profile can be positioned, for example, in the copy plane or in the vicinity thereof so that it does not interfere with the normal copier operation (for example, rotated in) or the copy plane can for this measurement step be projected onto a copying light detector by way of a projection optic or by way of a mirror.

If the copying light profile is determined in the manner described above and especially when digitalized, the transmission profile of the local transmission modulator can be changed based on the profile determined (for example intensity profile, profile of the optical density). For example, if it has been determined that certain areas in the copying light profile are undesirably brighter than the remaining areas, the transmission profile of the local transmission modulator is locally reduced in such a way that those brighter areas are darkened to the brightness of the remaining areas. For the case of a liquid crystal matrix, the transmission of the liquid crystal elements associated with this area is thus lowered in an appropriate manner. In the case of a photographic paper, bright areas of the copying light profile result in darkened areas on the photographic paper.

In order to optimize tie copying light profile for the copying process of photographic originals, the transmission profile preselected for the copying process is preferably changed so that a copy results which corresponds to a copy that would have been achieved with a copier with an optimum copying light profile. The transmission profile preselected for the copying process is therefor-preferably changed so that one would have detected an optimum copying; light profile with a corresponding change of the specific transmission profile used for the measurement of the copying light profile. The optimization is such that one determines upon a further determination of the copying light profile that the deviation of the determined copying light profile from the desired copying light profile is smaller or minimized. Such a repeated determination or measurement can be carried out in order to test the optimization. However, this is not absolutely necessary. Also, an iterative approximation to the optimum results can be achieved with several determination or measurement processes and changes of the transmission profile based thereon. The local transmission modulator is thereby preferably controlled so that a focused projection of the transmission modulator onto the copy plane results. However, one refrains from an iterative approximation upon an unfocused projection of the local transmission modulator onto the copy plane.

In order to achieve the desired copying light profile, preferably a mathematical relationship is determined between the desired copying light profile and the determined (measured) copying light profile and/or the deviation or difference between the desired and the determined copying light profile and, based thereon, the transmission profile of the local transmission modulator preselected for a copier process is changed.

For example, if a region (element) 1 of the local transmission modulator upon focused projection is associated on the basis of the optical projection geometry present with a region i' in the copy plane, and if the local transmission modulator in the region (element) i has a specific transmission $T_i$ (before the optimization) then the copying light profile is expressed in the region i I in the copy plane, for example, by an intensity $I_{i'}$ of the copier light. For this case, the transmission of the local transmission modulator $T_i$ is then preferably changed to an optimal transmission $Topt_i$. Thus, upon expression in transmission and intensity, it results:

$$Topt_i = T_i \times (Inom_{i'}, I_{i'})$$

$I_{i'}$ is thereby the measured intensity at the location i', $Inom_{i'}$, the nominal intensity at the location i', $T_i$ the transmission of the element 1 of the transmission modulator and $Topt_i$, the optimized transmission of the element i.

The transmission matrix of the local transmission modulator is preferably projected out of focus onto the copy plane for the copying of an original, in order not to make visible any sharp brightness edges in the copy. However, for the measurement of the copying light profile it is preferably projected in focus. The transmission modulator can therefor be designed for variation between a focused and an unfocused position.

Preferably, a copying light profile once measured and determined is used for the change of the transmission profile during a plurality of copying processes, especially with different photographic originals.

It is advantageous to measure the copying light profile after the copying light has passed at least the multitude of the optical components (light scattering, light of sorting and light conductive means), in order to so detect the essential inhomogeneities or copy errors during the copying light measurement. Especially preferably, the copying light measurement is carried out after passage through a local transmission modulator. Especially those inhomogeneities caused by the local transmission modulator can thereby be taken into consideration.

If in a copier, for example depending on the original or a film type, a different spectral composition of the copying light (copying light of different colors) is used or if a sequential exposure with different colors has taken place, the copying light profile is preferably determined for the respectively used copying light (of one specific color) and the, change of the transmission profile of the local transmission modulator carried out depending on the spectral composition (color) of the copying light. When within a copying process, i.e. during the projection of an original onto a copier material, copier light of different spectral composition (color) is sequentially used, the transmission profile of the local transmission modulator is preferably changed in the corresponding time sequence depending on the spectral composition (color) of the copying light, and especially according to the copying light profile measured for each copying light (of a specific color).

Preferably, a compensation matrix is determined from the determined copying light profile (see also FIG. 2), which is stored and used for the change of the transmission profile during each copying process. The change of the transmission profile is preferably based on a digital calculation process. A transmission matrix describing the transmission profile is thereby preferably calculated based on the compensation matrix mentioned. The copy matrix specific for each copying process thereby enters into the calculation of the transmission matrix. The copy matrix is especially determined from the image data of the photographic original in that, for example, the photographic original is optically detected or scanned before the copying process. If the elements of the copy matrix and the compensation matrix respectively describe optical densities, the transmission matrix then results, for example, simply by addition of the copy matrix and the compensation matrix.

When different projection lenses are used in a copier corresponding to different enlargements, a compensation matrix can be stored for each projection lens and can then be applied according to the projection lens respectively used. This is especially advantageous because different lenses have a different decline of the copying light intensity from the center to the edge. An optimal copying light can thereby be achieved for each desired enlargement (projection lens).

A transparent element for the measurement of the copy or light profile, for example, a gray filter or a suitably exposed photographic original can be permanently provided in a photographic copier in accordance with invention. The transparent element can then be moved, for example, for the measurement into the light path (for example, rotated thereinto) and is preferably removed from the light path for the conventional copying processes. Conversely, any photographic original of unknown transmission profile, for example, a normal original to be copied is preferably removed from the light path for the measurement of the copying light profile. Also, a light measuring device such as, for example, a photo diode array can be permanently provided in the copier for the measurement of the copying light profile. This measuring device can be positioned, for example, in the paper platform. The transparent element is preferably so mounted that it can be automatically inserted into the light path when a measurement of the copying light profile is to be carried out. On desired changes of the copying light profile can be detected in this manner for example, in certain operating time intervals and compensated. Also, an input device can be provided for the input of a compensation matrix by a maintenance person who has measured the copying light profile and calculated the compensation matrix there from.

BRIEF DESCRIPTION OF THE DRAWINGS

The above objects and features of the present invention will be more apparent from the following description of the preferred embodiments with reference to the accompanying drawings, wherein.

DETAILED DESCRIPTION OF THE PREFERRED EMBODIMENT

In the following, equal reference numbers identify equal parts or devices.

Figure 1A:
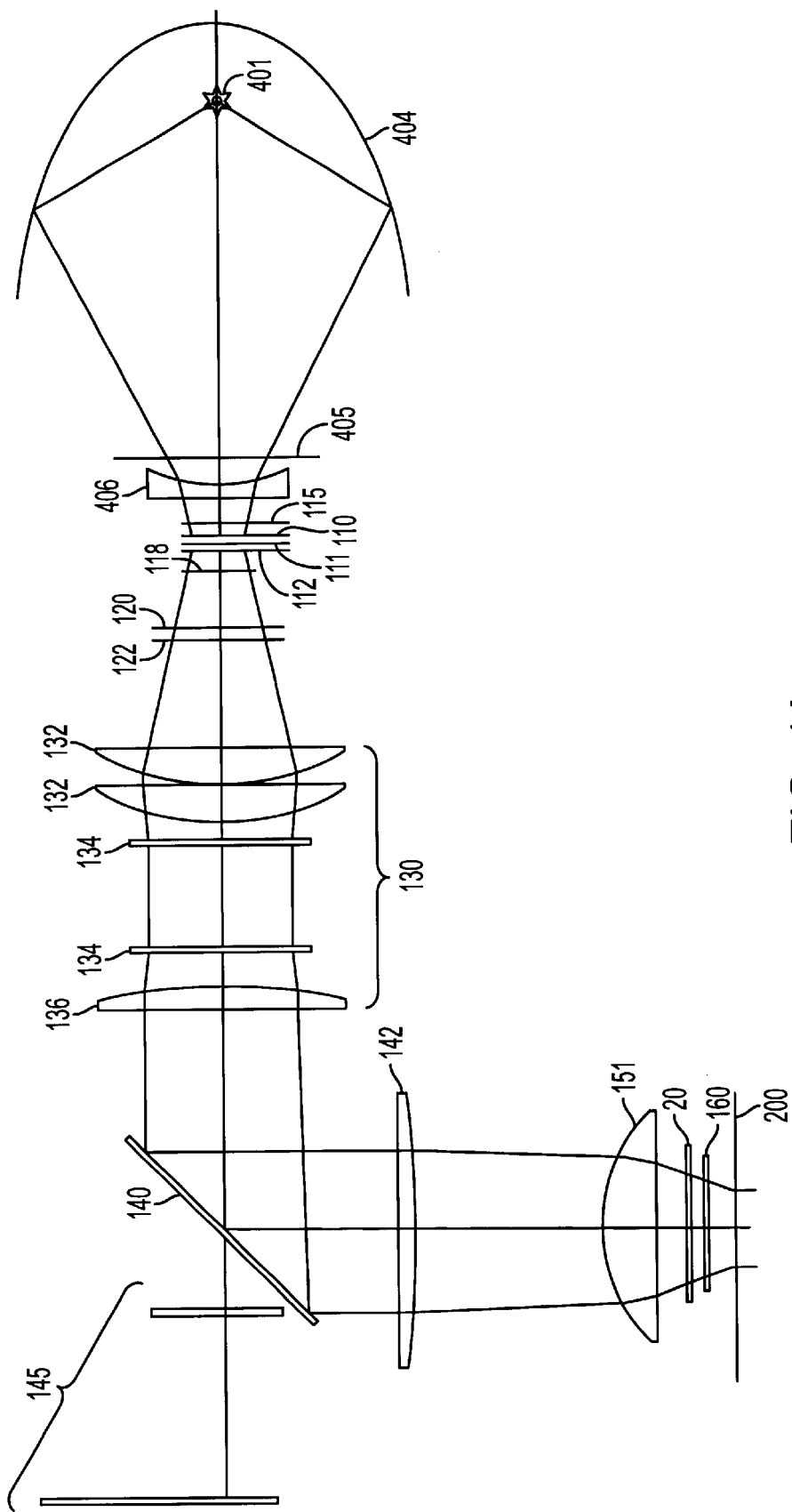
FIG. 1a shows the first part of a light path in the illumination unit of a photographic copier.

FIG. 1a shows a schematic overview of the arrangement of the optical components in a photographic copier. The copying light emitted by the lamp 401 is reflected and bundled by the elliptical reflector 404 and directed to a first scattering lens 406. A heat protection filter 405 is provided before this lens which does not let infrared radiation go through. The reference numbers 110, 111 and 112 designate hinged color filters for the colors magenta, cyan and yellow which can be rotated into the light path and only allow light of a specific wavelength range to pass through.

Furthermore, a (black) shutter 115 is provided which opens and closes the illumination. An attenuation wheel 118 is provided in combination with the shutter 115. This attenuation wheel includes gray filters of different transmission. A desired illumination can thereby be achieved in combination with the shutter and the color filters. Especially, the illumination time can be maintained within a certain range. So-called comb filters 120 and balance filters 122 are provided subsequent to the attenuation wheel. The comb filter 120 allows light to pass in three defined, preselected spectral regions. The spectral regions are adapted to the spectral sensitivity of the photographic paper for the production of colors on the photographic paper. Apart from a spectral adaptation of the copier light, an intensity adaptation for equalization of the illumination times for all three colors is also carried out by way of the balance filter. The latter insures that each of the three wavelength regions separated by the comb filter 120 impact on the photographic paper with an intensity adapted thereto.

130 shows a collimator arrangement to render light parallel with two lenses 132, two integrator plates 134 and a further lens 136. The integrator lens is also called honeycomb lens or integrator plate. Two integrator plates 134 are provided in the present case.

The illumination light exiting the lens 136 is then reflected by a beam splatter 140 and downwardly directed to a further lens 142. The light then exits from there to the lens 151, to the liquid crystal matrix (local transmission modulator) 20 and to the scatter disk 160.

The mirror 140 is partly transparent and only a part of the light is detected by a light measuring system 145. The illumination unit is calibrated therewith.

The mentioned liquid crystal matrix 20 is provided at the lower end of the light conduit. The light conduit is closed at the lower end by a scatter disk 160.

A not illustrated interface is provided for the control of the liquid crystal matrix which is in communication with a control device and provides the control signals for the control of the liquid crystal matrix.

Figure 1B:
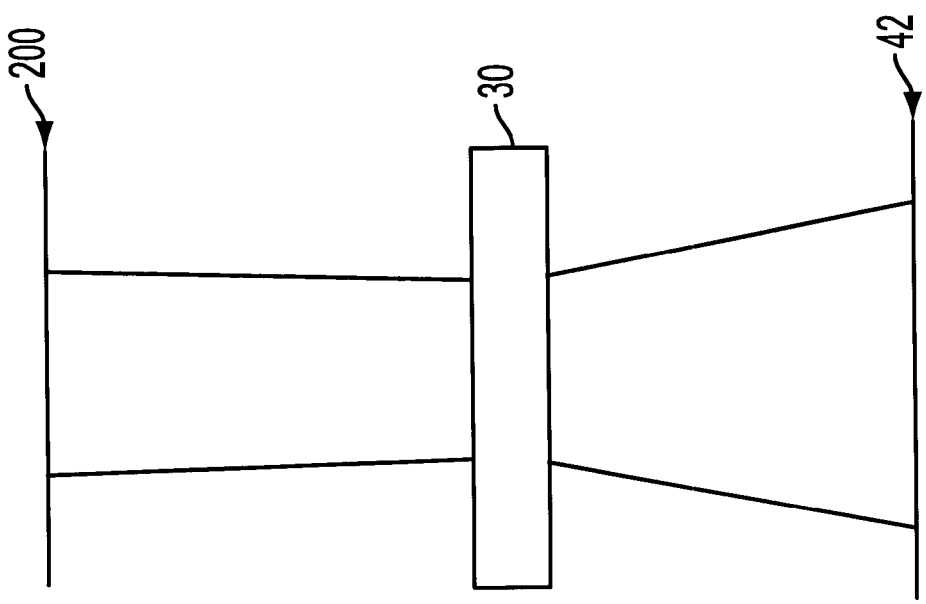
FIG. 1b shows the continuation of the light path of FIG. 1a, in the projection unit of the photographic copier.

The liquid crystal matrix 20 is positioned such that it is only overlaid out of focus onto the photographic original (film) 200. The film 200 is projected onto the photographic paper 42 by way of a lens 30 shown in FIG. 1b. A second shutter (not illustrated) is positioned after the projection lens 30 which protects the photographic paper from extraneous light. The transparent element (not illustrated) can be positioned, for example, at this location.

Preferably, a transparent element with known transmission profiles, i.e., for example, a homogeneously exposed film or homogeneous gray filter with average transmission is placed in the light path for measurement of the copying light profile, for example at the above mentioned location. The film 200 is removed from the light path. Furthermore, a light measurement device (detector) which can measure the light broken down by area is preferably positioned in the light path at the location of the photographic paper 42. The copying light measurement device can be a photo diode array or simply photographic paper. In order to obtain a defined measurement environment for determination of the copying light profile, the liquid crystal matrix 20 is preferably controlled such that a homogeneous transmission profile is achieved for the liquid crystal matrix. If the transmission profile deviates from a homogeneous profile, this is recognized by the copying light profile measurement and can then be compensated together with other inhomogeneities. If the measurement is carried out by way of photographic paper, the coloring thereof or the blackening is locally measured, for example, by way of a densitometer or scanner, whereby the grading of the paper is considered for the determination of the copying light profile.

If a nonlinear connection results between the control of the transmission matrix for the individual matrix elements and the measured copying light in different regions of the copy plane, the characteristic lines can be stored, for example, in a table and later taken into consideration accordingly.

The measured copying light profile is preferably digitalized. In the case where the copying light profile was measured with a photographic paper, this is optically recorded, for example, by way of a scanner and thereby digitalized.

Figure 2:
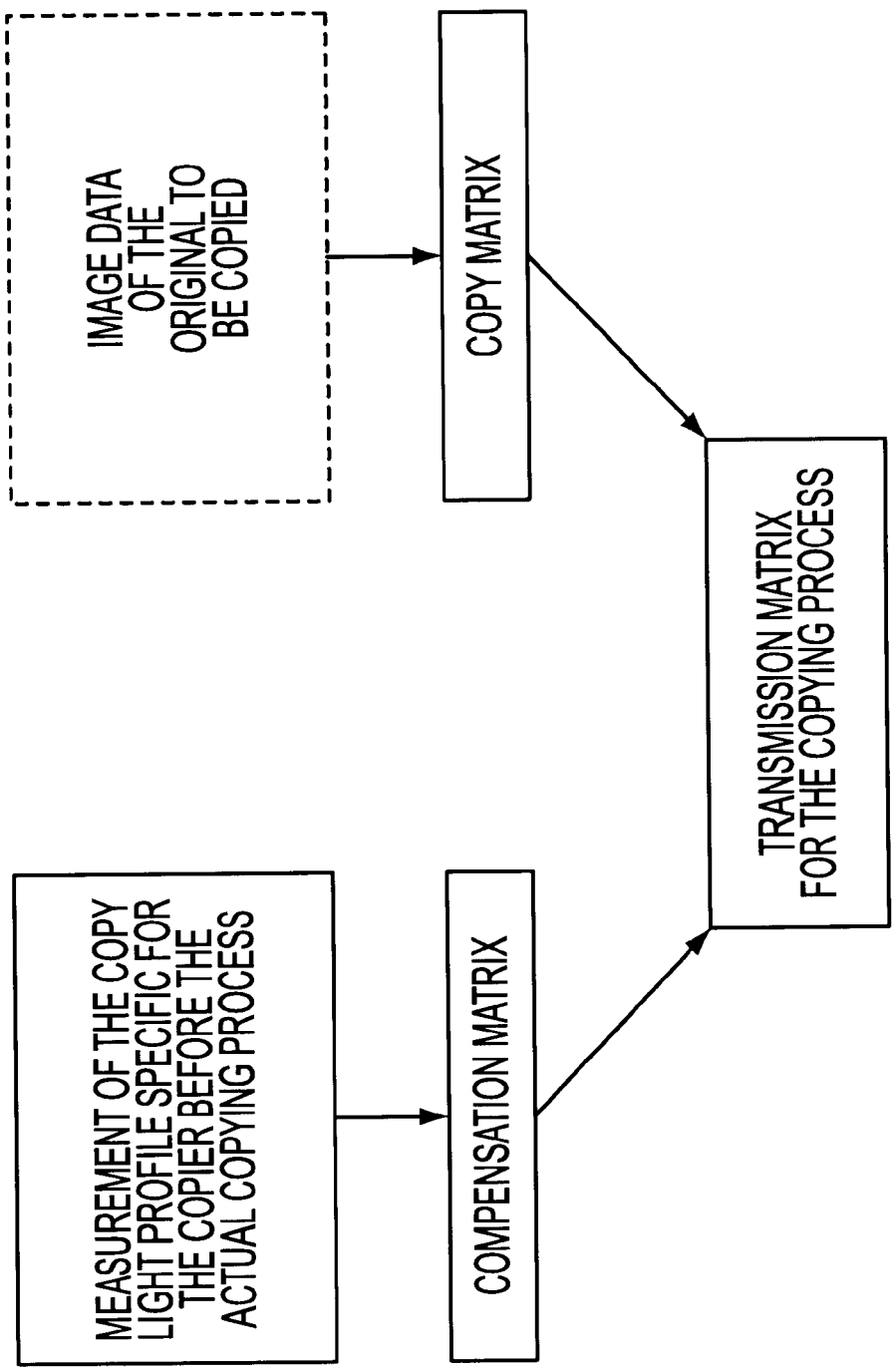
FIG. 2 shows a sequence for determination of a transmission matrix for a local transmission modulator.

As described in FIG. 2, the measurement of the copying light profile is carried out before the copying light profile is optimized for subsequent copying processes. A compensation matrix is preferably derived from the determined copying light profile and then stored. The compensation matrix is preferably calculated so that in the above described measurement process an optimal copying light profile would result or results in the copy plane during control of the liquid crystal matrix according to the compensation matrix.

In order to simulate the presence of an optimal copying light profile during the respective copying processes of a photographic original, the compensation matrix (see FIG. 2) is also considered during normal copying. During the normal copying operations, the liquid crystal matrix is preferably controlled according to a transmission matrix, whereby the elements of the transmission matrix describe the degree of transmission of individual elements of the liquid crystal matrix. It can be desirable for the copying of a photographic original that the brightness profile of the copy is manipulated, which means the transmission profile of the liquid crystal matrix should not be homogeneous. This desired manipulation is described by a copy matrix. In a copying operation according to the prior art, the transmission matrix would coincide with the copy matrix. However, according to the present invention, the transmission matrix is calculated from the compensation matrix as well as the copy matrix. For a compensation matrix determined in the above manner, the compensation matrix and the copy matrix are preferably added, if the matrices describe the optical density.

The elements of the copy matrix are preferably derived from the image data of the original to be copied. The image data of the original to be copied are thereby detected before the copying process by an optical scanning process.

The calculation of the transmission matrix from the compensation matrix and the copy matrix can be varied depending on the specific image data of the original to be copied, their analysis, or their classification. For example, the color and/or the brightness to be expected in a certain region of the copy can also enter into the equation.

A calculating unit is preferably used for the calculation of the matrices such as a CPU or ASIC. The liquid crystal matrix (local transmission modulator) can also be used in conventional copiers for the optimization of the copying light profile. The copier is therefor equipped, for example, with an additional calculating unit which is coupled with a control of the liquid crystal matrix, or an already present calculating unit, or the control is re-programmed.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for the optimization of a copying light profile during copying of photographic originals in a photographic copier, wherein the copier comprises:

a light source for producing copying light for the copying process, a number of optical, light conducting means for guiding the copying light along a light path from the light source through the photographic original to a copier material, and for the shining through of the photographic original and for the projection of the shone through original onto the light sensitive copier material, and a local transmission modulator through which the copying light is guided by way of the light conducting means, before it exposes the copier material, the transmission of which is controllable locally for the production of a transmission profile and the transmission profile of which is preselected for the copying process in dependence of the photographic original to be copied, the method comprising the steps of:
a) creating a defined measuring environment for measuring a profile of the copying light by providing a transparent element with a known transmission profile in the light path for being shone through or by using the copying light without a transparent element positioned in the light path, wherein no photographic original to be copied and of unknown transmission profile is positioned in the light path, and furthermore a transmission profile specific for the local transmission modulator is provided;
b) measuring the copying light resulting from step a) broken down by area, the profile of the copying light being measured and compared with a desired copying light profile; and
c) optimizing the transmission profile preselected for the copying process for the copying of photographic originals onto copier material, based on the comparison in step b).

2. Method according to claim 1, wherein the transmission profile of the local transmission modulator preselected for the optimization is changed so that a corresponding change of the measurement specific transmission profile in step a) upon a repeated determination of the copying light profile according to step b) results in at least one of a reduced and minimized deviation of the determined copying light profile from the desired copying light profile.

3. Method according to claim 1, wherein said measuring step occurs after the copying light has passed through a plurality of the light conducting means.

4. Method according to claim 1, wherein said measuring step occurs after the copying light has passed the local transmission modulator.

5. Method according to claim 1, wherein said measuring step occurs in at least approximately a plane in which copier material for the copying process is provided.

6. Method according to claim 1, wherein the transparent element provided is a gray filter or a transparent original with a transmission profile that is at least one of known and homogeneous.

7. Method according to claim 1, wherein the transmission profile specific for the local transmission modulator is homogeneous.

8. Method according to claim 1, wherein the local transmission modulator comprises a plurality of transmission elements the degree of transmission of which is controlled according to a transmission matrix, and wherein the transmission matrix is calculated from a combination of a compensation matrix and a copy matrix.

9. Method according to claim 8, wherein the copy matrix corresponds to the preselected transmission profile and the compensation matrix is derived from the comparing step.

10. Method according to claim 1, wherein the measuring step further includes the use of copier material or a light detector.

11. Method according to claim 9, wherein the copy matrix is calculated from digitalized photographic image data representing a photographic original to be copied.

12. A method for the optimization of a copying light profile during copying of photographic originals in a photographic copier, wherein the photographic copier comprises a light source for producing copying light, a number of light conducting means, and a local transmission modulator, the method comprising the steps of:

creating a resultant copying light profile either by providing at least one transparent element with a known transmission profile in a path of the copying light or by using the copying light without a transparent element positioned in the path;

providing a transmission profile specific for the local transmission modulator;

measuring the resultant copying light profile;

comparing the resultant copying light profile with a desired copying light profile; and changing the transmission profile based on the step of comparing.

13. Method according to claim 12, wherein the number of light conducting means guides the copying light along a path from the light source through a photographic original to a copier material.

14. Method according to claim 13, wherein the number of light conducting means guides the copying light to shine through the photographic original and project the shone through original onto the light sensitive copier material.

15. Method according to claim 12, wherein the copying light is guided by way of the light conducting means through the local transmission modulator before the copying light exposes the copier material.

16. Method according to claim 15, wherein the local transmission modulator is controllable locally for producing a transmission profile, which is preselected for the copying process based on the photographic original to be copied.

* * * * *